United States Patent [19]

Banno et al.

[11] Patent Number: 4,507,432

[45] Date of Patent: Mar. 26, 1985

[54] CURING METHOD FOR UNSATURATED POLYESTER RESIN

[75] Inventors: Shigeki Banno; Takeshi Komai, both of Aichi, Japan

[73] Assignee: Nippon Oil & Fats Co., Ltd., Tokyo, Japan

[21] Appl. No.: 544,638

[22] Filed: Oct. 24, 1983

[30] Foreign Application Priority Data

Nov. 1, 1982 [JP] Japan ............................. 57-190726

[51] Int. Cl.³ ...................... C08L 67/06; C08L 63/10
[52] U.S. Cl. ........................................ 525/21; 525/17; 525/25; 525/27; 525/40; 525/49; 525/531
[58] Field of Search ................... 525/27, 40, 49, 531, 525/17, 21, 25

[56] References Cited

U.S. PATENT DOCUMENTS 3,814,724  6/1974  Suzuki .................................. 525/49

*Primary Examiner*—John C. Bleutge
*Assistant Examiner*—Patricia Short
*Attorney, Agent, or Firm*—Oblon, Fisher, Spivak, McClelland & Maier

[57] ABSTRACT

In curing an unsaturated polyester resin in the presence of an organic peroxide added thereto, 4-methyl-2,4-diphenyl-pentene-1 is added to the mixture of the unsaturated polyester resin with the organic peroxide to enhance the curing properties.

13 Claims, No Drawings

CURING METHOD FOR UNSATURATED POLYESTER RESIN

BACKGROUND OF THE INVENTION

1. Field of the Invention

This invention relates to an improved method for curing an unsaturated polyester resin. More particularly this invention relates to a method for curing an unsaturated polyester resin by adding thereto an organic peroxide, which is a conventional curing agent, and 4-methyl-2,4-diphenyl-pentene-1.

2. Description of Prior Art

Various cured and moulded articles of an unsaturated polyester resin can be obtained by curing and moulding an unsaturated polyester resin with an organic peroxide as a curing agent.

In the curing of unsaturated polyester resins, besides (1) an organic peroxide essentially used as the curing agent, there may be optionally used (2) a curing accelerator and (3) a polymerization inhibitor. The curing reaction of the unsaturated polyester varies with the combination of these additives and the curing temperature can be made to vary in the range of from room temperature up to about 180° C. by suitably altering this combination.

The curing reaction of the unsaturated polyester resin may be generally characterized by the time required for gelation of the unsaturated polyester resin (hereinafter referred to as GT), the time required for complete cure (hereinafter referred to as CT), and the highest temperature reached because of accumulation of the heat generated in the course of the curing (hereinafter referred to as PET).

While GT and CT can be varied by altering the additives, (1) through (3), mentioned above, PET cannot be varied at will.

It is known that PET is desired to be low and that if it is high, then the cured resin acquires high inner stress which may possibly constitute a cause for cracks and deformation.

As reported in Polymer Engineering and Science, Vol. 19, p 774 (1979), if in the compression moulding of a sheet molding compound, PET is high, then the resultant press molded article sustains over cure and consequently fails to exhibit good quality.

As a control to lower PET in the course of curing an unsaturated polyester resin by the addition thereto of a ketone peroxide and cobalt naphthenate, a method involving further addition of t-butylhydroperoxide to the unsaturated polyester resin is suggested in Künststoffe, Vol. 69, p. 266 (1979).

This method, however, is effective only in curing the unsaturated polyester resin at room temperature in the presence of a ketone peroxide and cobalt naphthenate added thereto and it is not effective in carrying out the same curing at an elevated temperature.

This method, therefore, has only limited commercial value.

The need for developing a curing method for an unsaturated polyester resin to be carried out with PET lowered as desired without reference to the kind of the curing agent added to the unsaturated polyester resin has been keenly felt.

SUMMARY OF THE INVENTION

One object of this invention is to provide a novel curing method of an unsaturated polyester resin while satisfying the need mentioned above.

After an extensive study, the inventors of this invention have ascertained that in the curing an unsaturated polyester resin, addition of 4-methyl-2,4-diphenyl-pentene-1 to the reaction system enables PET to be effectively lowered without reference to the type of the organic peroxide used and the curing temperature involved therein. This invention has been perfected on the basis of this knowledge.

To be specific, this invention relates to an improved curing method for an unsaturated polyester resin by adding an organic peroxide as a curing agent either alone or, when necessary, in combination with a curing accelerator or some other additive, which method is characterized by adding 4-methyl-2,4-diphenyl-pentene-1 to the reaction system.

DETAILED DESCRIPTION OF THE PREFERRED EMBODIMENT

The expression "unsaturated polyester resin in the present invention" is broadly defined to include not merely unsaturated polyester resins in the ordinary sense of the term but also vinyl ester resins as will be described below. To be specific, mixtures of unsaturated alkyds obtained by polycondensation between radically polymeric dibasic acids represented by maleic acid and fumaric acid or non-radically polymeric dibasic acids represented by phthalic acid and glycols represented by ethylene glycol, propylene glycol, and bis phenol A with polymeric monomers represented by styrene, diallyl phthalate, acrylic esters, and methacrylic esters are also defined as unsaturated polyesters.

As examples can be cited such mixtures, generally called vinyl esters, as are obtained by mixing (1) a compound obtained by ring opening vinyl addition of epoxy resins represented by epichlorohydrin type epoxy resins, methylepichlorohydrin type epoxy resins and alicyclic epoxy resin with radically polymeric monobasic acids represented by acrylic acid and methacrylic acid and/or dibasic acids represented by fumaric acid, maleic acid, and adipic acid, with (2) a polymeric monomer represented by styrene, acrylic esters, methacrylic esters, and diallyl phthalate.

The organic peroxide to be used in this invention may be any of those organic peroxides which are capable of curing unsaturated polyester resins. Concrete examples of the organic peroxide include ketone peroxide, diacyl peroxide, hydroperoxide, peroxydicarbonate, peroxymonocarbonate, peroxyketal, peroxyesters, and dialkylperoxides.

The curing accelerator to be optionally used in this invention may be any of those curing accelerators which are capable of accelerating the cure of unsaturated polyester resins. Concrete examples of the curing accelerator include metal soaps, amines, quaternary ammonium salts, organic metal compounds, $\beta$-diketones, and esters of $\beta$-keto acid. As popularly practised, a plurality of types of curing accelerators may be used in combination to synergize their individual effects. The combination of cobalt naphthenate and N,N-dimethyl aniline and the combination of cobalt naphthenate and acetylacetone are good examples.

The amount of 4-methyl-2,4-diphenyl-pentene-1 which is to be added to the unsaturated polyester resin in accordance with this invention is desired to be not less than 0.1% by weight and not more than 10% by weight, based on the amount of the unsaturated polyester resin.

If the amount of 4-methyl-2,4-diphenyl-pentene-1 added is less than 0.1% by weight, then the compound's effect in lowering PET is not sufficient. Although this effect gradually increases as the amount of the compound added is increased up to 10% by weight, substantially no addition to the effect is obtained when the amount of the compound added exceeds 10% by weight. Use of 4-methyl-2,4-diphenyl-pentene-1 in a large amount proves undesirable from the economic point of view. Thus, the upper limit of the amount of this compound is fixed at 10% by weight as described above.

This compound is particularly effective when the amount thereof falls in the range of 0.5% to 5% by weight.

The method of this invention can be carried out by any ordinary procedure followed in the curing of an unsaturated polyester resin, for example by adding an organic peroxide and 4-methyl-2,4-diphenyl-pentene-1 optionally in conjunction with ordinary additives such as curing accelerator and polymerization inhibitor to the unsaturated polyester resin and subsequently curing the resultant mixture at room temperature or at an elevated temperature under ordinary conditions.

Since 4-methyl-2,4-diphenyl-pentene-1 is an inactive substance, it may be mixed with the unsaturated polyester resin, the organic peroxide, or the curing accelerator before the curing operation is started.

Unlike the conventional method which is effective only when there are used specific additives, the method of the present invention is characterized by permitting PET to be lowered without sacrificing the pot life of the unsaturated polyester resin, and without reference to the kind of the organic peroxide to be used as the curing agent.

What makes the present invention very special is its use of 4-methyl-2,4-diphenyl-pentene-1. More specifically, although 4-methyl-2,4-diphenyl-pentene-1 functions as a chain transferer not all other substances which function in this way can produce the aforementioned effects of this invention. When lauryl mercaptan or thioglycollic acid, which are typical chain transferers, is added to an unsaturated polyester resin being cured, desired lowering of PET may be obtained depending on the type of the organic peroxide used in the curing operation. Since the use of such a chain transferer results in a heavy decrease in GT, the unsaturated polyester resin is completely gelled before it completes moulding. Thus, a shaped article of good quality cannot be obtained. Besides, the use of the chain transferer notably shortens the pot life of the unsaturated polyester resin including organic peroxide. Thus, the use of lauryl mercaptan or thioglycollic acid as additive to the unsaturated polyester resin has very low commercial value. In contrast, the method of the present invention is characterized by showing no peculiarity to the type of the organic peroxide to be used and refraining from shortening GT or the pot life as described above.

According to the information contained in the Polymer Handbook, Second Edition (John Wiley & Sons, Inc.), the chain transfer constant exhibited in the polymerization of styrene is 0.29 with 4-methyl-2,4-diphenyl-pentene-1, 19 with lauryl mercaptan, and 14 with thioglycol. It is, therefore, clear that PET is not lowered more because the chain transferer used as a larger chain transfer constant and that the effect manifested in lowering PET is peculiar to 4-methyl-2,4-diphenyl-pentene-1.

The method of this invention not merely lowers PET effectively but also permits the curing reaction to be terminated midway in the course of the reaction by adjusting the amount of the organic peroxide added and selecting the curing temperature suitably. The curing of the unsaturated polyester resin so terminated may be continued to completion by restarting the application of heat to the system.

Now, the present invention will be described more specifically below with reference to working examples and comparative experiments.

EXAMPLE 1

To 100 g of a commercially available unsaturated polyester resin (produced by Nippon Shokubai Kagaku Kogyo K.K. and sold under the name of Epolack G-110AL), 1 g of methylethyl ketone peroxide (MEKPO) and 0.3 g of a styrene solution of cobalt naphthenate containing 6% of cobalt (6% Co) were added and further 1 g of 4-methyl-2,4-diphenyl-pentene-1 ($\alpha$-MSD) was added. The resultant mixture was cured at 25° C. In this case, the curing properties, namely, CT, GT, and PET, and the pot life at 20° C. were determined. The curing properties and the pot life were determined by the methods of JIS (Japanese Industrial Standard) K-6901.

To be more specific, a specimen prepared by uniformly mixing an unsaturated polyester resin with an additive such as organic peroxide etc. was inserted into a test tube having a diameter of 18 mm to a depth of 100 mm from the bottom of the test tube, and the temperature measuring contact portion of a thermocouple was retained in the central portion of the specimen. The test tube was fixed to a thermostatic bath containing liquid therein and maintaining its temperature in the range of from 0.5° C. lower than to 0.5° C. higher than the temperature for hardening the specimen so that the upper surface of the specimen in the test tube was disposed 1 cm below the liquid surface in the thermostatic bath. The time GT required for the temperature of the specimen to rise from a temperature 15° C. lower than the bath temperature to a temperature 5° C. higher than the oven temperature, the time CT required for the temperature of the specimen to rise from a temperature 15° C. lower than the oven temperature to the maximum temperature, and the temperature PET regarded as the maximum temperature were measured.

A 50 g specimen having an unsaturated polyester resin mixed with an additive such as organic peroxide etc. was inserted into a beaker having a capacity of 50 ml. In a thermostatic bath which contained liquid therein and maintained a constant measuring temperature, the beaker was fixed so that the upper surface of the specimen in the beaker was disposed 1 cm below the liquid surface of the thermostatic bath. The specimen was stirred with a glass bar twice a minute and, every one minute, the glass bar was lifted up. The stirring and lifting operations were continued until the specimen adhered to the glass bar was torn off without being lifted up in the form of a thread. The time which lapsed up to the tearing phenomenon, representing the pot life, was measured.

The results were as shown in Table 1.

COMPARATIVE EXPERIMENTS 1–4

The procedure of Example 1 was followed, except that the addition of α-MSD was omitted in Comparative Experiment 1, lauryl mercaptan ($C_{12}SH$) and thioglycollic acid (TGA) were respectively used as chain transferers each in an amount of 1 g in Comparative Experiments 2, 3, and t-butyl hydroperoxide (TBHP), a compound known to be useful for the adjustment of PET, was used in an amount of 1 g in Comparative Experiment 4. The curing properties and the pot life were similarly determined. The results were as shown in Table 1.

TABLE 1

| | Name of additive | Curing properties | | | Pot life (min.) |
|---|---|---|---|---|---|
| | | GT (min.) | CT (min.) | PET (°C.) | |
| Example 1 | α-MSD | 25 | 50 | 38 | 42 |
| Comparative Experiment 1 | None | 19 | 31 | 133 | 28 |
| Comparative Experiment 2 | $C_{12}SH$ | 1 | 7 | 108 | 2 |
| Comparative Experiment 3 | TGA | 5 | 10 | 30 | 10 |
| Comparative Experiment 4 | TBHP | 42 | 90 | 30 | 46 |

The following conclusions can be drawn from Table 1. Comparison between Example 1 and Comparative Experiment 1 reveals that the method of this invention which used α-MSD exhibited low PET and a long pot life and long GT without having any adverse effect upon other properties. Comparative Experiment 2 suffered high PET. Although Comparative Experiments 3, 4 had low PET, the former had a short pot life and decreased GT and CT, and the latter increased CT and GT.

All considered, it is evident that the method of this invention effectively lowered PET and increased pot life.

EXAMPLE 2

The procedure of Example 1 was followed to cure the unsaturated polyester resin, except that 1 g of benzoyl peroxide (BPO) was added in the place of MEKPO and 6% Co. The curing properties and the pot life were determined. The curing operation was performed at 80° C. and the determination of the pot life at 40° C. The results were as shown in Table 2.

COMPARATIVE EXPERIMENTS 5–7

The procedure of Example 2 was followed, except that the addition of α-MSD was omitted in Comparative Experiment 5 and $C_{12}SH$ and TBHP were respectively added each in an amount of 1 g in the place of α-MSD in Comparative Experiments 6, 7. The curing properties and the pot life were similarly determined.

The results were as shown in Table 2.

TABLE 2

| Name of additive | Curing Properties | | | Pot life (hr.) |
|---|---|---|---|---|
| | GT (min.) | CT (min.) | PET (°C.) | |
| Example 2 α-MSD | 12.0 | 19.0 | 149 | 42 |
| Comparative Experiment 5 None | 11.5 | 15.0 | 198 | 41 |
| Comparative Experiment 6 $C_{12}SH$ | 6.5 | 13.0 | 115 | 4 |
| Comparative Experiment 7 TBHP | 9.5 | 13.0 | 214 | 9 |

It is noted from Table 2 that in the thermal curing with BPO, the method of this invention (Example 2) exhibited a lower PET than the method omitting the addition of α-MSD (Comparative Experiment 5) while exhibiting about the same GT and pot life and that the other methods (Comparative Experiments 6, 7) had high PET and short GT and pot life.

EXAMPLE 3

The procedure of Example 1 was followed to cure the unsaturated polyester resin, except that 1 g of t-butyl peroxybenzoate (TBZ) was added in the place of MEKPO and 6% Co. The curing properties and the pot life were similarly determined. The curing operation was carried out at 100° C. and the determination of the pot life at 40° C.

The results were as shown in Table 3.

COMPARATIVE EXPERIMENTS 8–11

The procedure of Example 3 was followed, except that the addition of α-MSD was omitted in Comparative Experiment 8 and $C_{12}SH$, TGA, and TBHP were respectively added each in an amount of 1 g in the place of α-MSD in Comparative Experiments 9, 10, 11. The curing properties and the pot life were similarly determined.

The results were as shown in Table 3.

TABLE 3

| | Name of additive | Curing properties | | | Pot life (hr.) |
|---|---|---|---|---|---|
| | | GT (min.) | CT (min). | PET (°C.) | |
| Example 3 | α-MSD | 9.0 | 20.0 | 130 | 71 |
| Comparative Experiment 8 | None | 7.0 | 9.5 | 215 | 59 |
| Comparative Experiment 9 | $C_{12}SH$ | 2.0 | 3.5 | 194 | 8 |
| Comparative Experiment 10 | TGA | 3.0 | 4.5 | 207 | 7 |
| Comparative Experiment 11 | TBHP | 6.5 | 11.0 | 212 | 13 |

It is noted from Table 3 that in the thermal curing with TBZ, the method of this invention (Example 3) exhibited low PET, long pot life and long GT and the other methods (Comparative Experiments 8-11) exhibited high PET and short GT and pot life.

EXAMPLE 4

The procedure of Example 1 was followed to cure the unsaturated polyester resin, except that 1 g of cumene hydroperoxide (CHP) was added in the place of MEKPO and 6% Co. The curing properties and the pot life were similarly determined. The curing operation was carried out at 100° C. and the determination of the pot life at 40° C.

The results were as shown in Table 4.

COMPARATIVE EXPERIMENTS 12–15

The procedure of Example 4 was followed, except that the addition of α-MSD was omitted in Comparative Experiment 12, and $C_{12}SH$, TGA, and TBHP were respectively added each in an amount of 1 g in the place of α-MSD in Comparative Experiments 13, 14, 15. The curing properties and the pot life were similarly determined. The results were as shown in Table 4.

TABLE 4

| | Name of additive | Curing properties | | | Pot life (hr.) |
|---|---|---|---|---|---|
| | | GT (min.) | CT (min.) | PET (°C.) | |
| Example 4 | α-MSD | 7.0 | 15.0 | 140 | 22 |
| Comparative Experiment 12 | None | 6.0 | 9.0 | 209 | 22 |
| Comparative Experiment 13 | $C_{12}SH$ | 5.0 | 6.5 | 208 | 2 |
| Comparative Experiment 14 | TGA | 3.5 | 4.5 | 209 | 1 |
| Comparative Experiment 15 | TBHP | 6.0 | 12.5 | 191 | 12 |

It is noted from Table 4 that in the thermal curing with CHP, the method of this invention (Example 4) exhibited long PET, long pot life and long GT and the other methods (Comparative Experiments 12–15) all exhibited high PET.

EXAMPLE 5

The procedure of Example 1 was followed to cure the unsaturated polyester resin, except that 1 g of 1,1-bis-(t-butylperoxy)-3,3,5-trimethylcyclohexane (3M) was added in the place of MEKPO and 6% Co. The curing properties and the pot life were similarly determined. In this case, the curing operation was carried out at 80° C. and the determination of the pot life at 40° C.

The results were as shown in Table 5.

COMPARATIVE EXPERIMENTS 16–19

The procedure of Example 5 was followed, except that the addition of α-MSD was omitted in Comparative Experiment 16, and $C_{12}SH$, TGA, and TBHP were respectively added each in an amount of 1 g in the place of α-MSD in Comparative Experiments 17, 18, 19. The curing properties and the pot life were similarly determined.

The results were as shown in Table 5.

TABLE 5

| | Name of additive | Curing properties | | | Pot life (hr.) |
|---|---|---|---|---|---|
| | | GT (min.) | CT (min.) | PET (°C.) | |
| Example 5 | α-MSD | 14.0 | 24.0 | 100 | 27 |
| Comparative Experiment 16 | None | 12.5 | 15.0 | 207 | 23 |
| Comparative Experiment 17 | $C_{12}SH$ | 10.5 | 26.0 | 134 | 12 |
| Comparative Experiment 18 | TGA | 7.0 | 16.0 | 161 | 3 |
| Comparative Experiment 19 | TBHP | 14.0 | 23.0 | 110 | 12 |

From Table 5 it is noted that in the thermal curing with 3M, the method of this invention (Example 5) exhibited long PET, long pot life and long GT and the other methods (Comparative Experiments 16–19) exhibited high PET and short pot life and short GT.

EXAMPLE 6

The procedure of Example 1 was followed to cure the unsaturated polyester resin, except that 1 g of di-t-butyl peroxide (DTBP) was added in the place of MEKPO and 6% Co. The curing properties were similarly determined. In this case, the curing operation was carried out at 100° C.

The results were as shown in Table 6.

COMPARATIVE EXPERIMENTS 20–23

The procedure of Example 6 was followed, except that the addition of α-MSD was omitted in Comparative Experiment 20 and $C_{12}SH$, TGA, and TBHP were respectively added each in an amount of 1 g in the place of α-MSD in Comparative Experiments 21, 22, 23. The curing properties were determined similarly.

The results were as shown in Table 6.

TABLE 6

| | Name of additive | Curing properties | | |
|---|---|---|---|---|
| | | GT (min.) | CT (min.) | PET (°C.) |
| Example 6 | α-MSD | 35.0 | 45.0 | 112 |
| Comparative Experiment 20 | None | 35.0 | 40.0 | 203 |
| Comparative Experiment 21 | $C_{12}SH$ | 15.0 | 30.0 | 110 |
| Comparative Experiment 22 | TGA | 8.0 | 42.0 | 118 |
| Comparative Experiment 23 | TBHP | 7.0 | 13.0 | 192 |

It is noted from Table 6 that in the thermal curing with DTBP, the method of this invention (Example 6) exhibited low PET and long GT and the other methods (Comparative Experiments 20–23) exhibited either high PET or excessively short GT.

EXAMPLES 7–13

The procedure of Example 1 was followed, except that the amount of α-MSD added was varied as indicated in Table 7. The curing properties were similarly determined.

The results were as shown in Table 7.

TABLE 7

| | | Amount of α-MSD added (g) | Curing properties | | |
|---|---|---|---|---|---|
| | | | GT (min.) | CT (min.) | PET (°C.) |
| Example | 7 | 0.05 | 19.5 | 37.5 | 124 |
| | 8 | 0.1 | 20.0 | 41.0 | 89 |
| | 9 | 0.5 | 21.0 | 45.0 | 56 |
| | 10 | 2.0 | 28.0 | 52.0 | 36 |
| | 11 | 5.0 | 35.0 | 53.0 | 34 |
| | 12 | 10.0 | 40.0 | 55.0 | 32 |
| | 13 | 11.0 | 41.0 | 57.0 | 32 |

Comparison of the results of Table 7 with those of Comparative Experiment 1 given in Table 1 reveals that the effect of lowering PET was small when the amount of α-MSD added was less than 0.1% by weight. It is also noted that the effect was not conspicuously high when the amount of α-MSD added exceeded 10% by weight. Thus, the amount of α-MSD to be added in the method of this invention is desired to fall in the range of 0.1 to 10% by weight. The effect is conspicuous when the amount equals or exceeds 0.5% by weight.

EXAMPLE 14

The procedure of Example 1 was followed, except that a vinyl ester resin (produced by Showa Kobunshi K.K. and sold under the name of Ripoxy R-806) was used in the place of the unsaturated polyester resin and the amount of 6% Co was changed from 0.3 g to 0.5 g and 0.05 g of N,N-dimethyl aniline was newly added.

The curing properties were similarly determined. The results were as shown in Table 8.

COMPARATIVE EXPERIMENT 24

Example 14 was followed, except that the addition of α-MSD was omitted. The curing properties were similarly determined.

The results were as shown in Table 8.

TABLE 8

|  | Curing properties | | |
| --- | --- | --- | --- |
|  | GT (min.) | CT (min.) | PET (°C.) |
| Example 14 | 7.0 | 27.0 | 57 |
| Comparative Experiment 24 | 6.0 | 17.0 | 158 |

It is noted from Table 8 that the method of this invention was effective in lowering PET also in the curing of the vinyl ester resin.

As described in detail above, the method of this invention is advantageous in respect that it is capable of lowering PET without shortening GT and the pot life, and that without reference to the type of the organic peroxide to be used as the curing agent.

In contrast, although some of the conventional methods and the other methods using other chain transferers were capable of lowering PET depending on the type of organic peroxide used, most of them were ineffective in shortening PET or excessively lowered GT and the pot life.

What is claimed is:

1. In a curing method for an unsaturated polyester resin by the steps of adding an organic peroxide either alone or, optionally, in conjunction with a curing accelerator or some other additive to an unsaturated polyester resin and curing said unsaturated polyester resin, the improvement comprising further adding 4-methyl-2,4-diphenyl-pentene-1 to said unsaturated polyester resin in an amount of at least 0.1% by weight of said unsaturated polyester.

2. A method according to claim 1, wherein the amount of 4-methyl-2,4-diphenyl-pentene-1 to be added to said unsaturated polyester resin is in the range of 0.1 to 10% by weight based on said unsaturated polyester.

3. A method according to claim 1, wherein the amount of 4-methyl-2,4-diphenyl-pentene-1 to be added to said unsaturated polyester resin is in the range of 0.5 to 5% by weight based on said unsaturated polyester.

4. The method of claim 1 wherein the unsaturated polyester resin is a vinyl ester resin.

5. The method of claim 1 wherein the unsaturated polyester resin is a mixture of unsaturated alkyds obtained by polycondensation of polymeric dibasic acids with glycols.

6. The method of claim 5 wherein the dibasic acids are selected from maleic acid, fumaric acid and phthalate acid, and the glycols are selected from ethylene glycol, propylene glycol and bis phenol A.

7. The method of claim 5 wherein the unsaturated polyester is further in admixture with polymeric monomers selected from the group consisting of styrene, dialkyl phthalate, acrylic esters and methacrylic esters.

8. The method of claim 1, wherein organic peroxide is selected from ketone peroxide, diacyl peroxide, hydroperoxide, peroxydicarbonate, peroxyketal, peroxyesters and dialkylperoxides.

9. The method of claim 1 wherein the curing accelerator is selected from amines, quaternary ammonium salts, organic metal compounds, β-diketones, esters of β-keto acids and mixtures thereof.

10. The method of claim 1 wherein the amount of 4-methyl-2,4-diphenylpentene is at most 11% by weight of said unsaturated polyester.

11. The method of claim 10 wherein the amount of 4-methyl-2,4-diphenylpentene is at most 10% by weight of said unsaturated resin.

12. The method of claim 11 wherein the amount of 4-methyl2,4-diphenylpentene is at most 5% by weight.

13. The method of claim 1 wherein the amount of 4-methyl-2,4-diphenylpentene is at least 0.5% by weight of said unsaturated resin.

* * * * *